(12) United States Patent
Moon

(10) Patent No.: US 7,421,026 B2
(45) Date of Patent: Sep. 2, 2008

(54) MULTIPLEXING VIDEO DECODING APPARATUS AND METHOD

(75) Inventor: Dong-young Moon, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 486 days.

(21) Appl. No.: 10/789,984

(22) Filed: Mar. 2, 2004

(65) Prior Publication Data

US 2004/0174912 A1    Sep. 9, 2004

Related U.S. Application Data

(63) Continuation of application No. 09/561,919, filed on May 1, 2000, now abandoned.

(30) Foreign Application Priority Data

May 1, 1999    (KR) .................................... 99-15808

(51) Int. Cl.
    *H04N 7/18*    (2006.01)
(52) U.S. Cl. .............................. 375/240.25; 375/240.26
(58) Field of Classification Search ................................
                                              375/240.01–240.29
    See application file for complete search history.

(56) References Cited

U.S. PATENT DOCUMENTS 5,691,768 A      11/1997  Civanlar et al.
5,812,760 A  *   9/1998   Mendenhall et al. .......... 714/49
5,818,539 A  *   10/1998  Naimpally et al. .......... 348/512
6,061,711 A  *   5/2000   Song et al. .................. 718/108
6,175,595 B1     1/2001   Keesman
6,222,467 B1     4/2001   Moon
6,275,507 B1     8/2001   Anderson et al.
6,345,388 B1     2/2002   Nishio et al.

* cited by examiner

*Primary Examiner*—Andy S Rao
(74) *Attorney, Agent, or Firm*—Sughrue Mion, PLLC

(57) ABSTRACT

A multiplexing video decoding apparatus for decoding video signals of a plurality of channels and a method therefore are provided. The multiplexing video decoding method receives bit streams, each of which has a plurality of slices, in a plurality of channels and decodes bit streams of the plurality of channels in a multiplexed mode. The multiplexing video decoding method includes sequentially decoding video signals of the bit stream on a slice interval basis in one channel in the plurality of channels, and when the slice has been decoded, switching to decode a slice for each of the other channels; and decoding in a multiplexed mode bit streams of a plurality of channels by repeating the above steps to the following slice of each of the channels. The apparatus includes a plurality of FIFO memories for receiving and processing the multiple bit streams in parallel, a processor for sequentially decoding the bit streams from the FIFO memories, and a video processor to reproduce a video signal.

13 Claims, 6 Drawing Sheets

MULTIPLEXING VIDEO DECODING APPARATUS AND METHOD

This is a Continuation application of prior application Ser. No. 09/561,919, filed May 1, 2000; now abandoned the disclosure of which is incorporated herein by reference.

BACKGROUND OF THE INVENTION

1. Field of the Invention

The present invention relates to a technology for decoding digitally-compressed video signals, and more particularly, to a video decoding apparatus for decoding signals of a plurality of channels in a multiplexed mode and a method therefor.

2. Description of the Related Art

In general, a Moving Picture Experts Group 2 (MPEG-2) High Definition (HD) specification decodes a compressed video stream transmitted at a rate of 30 frames 1920 horizontal pixels by 1080 vertical pixels per second. The amount of data transmitted in the MPEG-2 HD standard is six times as much as that of Standard Definition (SD) data which is transmitted at the rate of 30 frames 720 horizontal pixels by 480 vertical pixels per second. A decoder which can decode HD-class video signals can decode 6 channels of SD-class video signals. For example, it is assumed that there is a sportscasting program included among digital television services. If a plurality of channels related to the program, such as scenes taken from various angles, are transmitted as SD-class signals, a viewer can watch the scenes on one HD-class screen. Thus, SD-class video signals of a plurality of channels must be decoded in parallel at the same time in a digital television. Such a task requires respective hardware for each channel in order to independently control and process in parallel video signals of a plurality of channels according to field structures, 3:2 pull-down, decoding and display control method. Thus, the structure of a device for decoding video signals of a plurality of channels becomes complicated. In addition, if decoding is executed in software, it also requires an operating system-level algorithm for managing a decoding task of each video channel, which increases complexity.

SUMMARY OF THE INVENTION

To solve the above problems, it is an objective of the present invention to provide a multiplexing video decoding apparatus for decoding video signals of a plurality of channels, by decoding cyclically and slice by slice video signals of a plurality of channels.

It is another object to provide a multiplexing video decoding method for decoding video signals of a plurality channels, by decoding cyclically and slice by slice video signals of a plurality of channels.

To accomplish the above objects of the present invention, there is provided a multiplexing video decoding method for receiving bit streams, where each of the bit streams has a plurality of slices, and the bit streams are transmitted in a plurality of channels. The method involves decoding the bit stream of each of the plurality of channels in a multiplexed mode in a multiplexing video decoding apparatus. The multiplexing video decoding method includes the steps of sequentially decoding video signals, in which the decoding includes decoding a slice of a bit stream of one channel from among the plurality of channels, then switching in a sequence to decode a slice of the bit stream for each of the other channels.

Decoding of a plurality of channel bit streams in a multiplexed mode is accomplished by repeating the above steps for a next slice of each of the channels.

To accomplish the other object of the present invention, there is also provided a multiplexing video decoding apparatus for receiving bit streams, each of which has a plurality of slices. The bit streams are received in a plurality of channels. The apparatus decodes the bit stream of each of the plurality of channels. The multiplexing video decoding apparatus includes a plurality of First-In First-Out (FIFO) units for transmitting (in a first-in-first-out manner) the bit streams of the plurality of channels in parallel; a syntax processor for cyclically decoding the bit streams of the plurality of channels output from the FIFO units at a slice interval; and a video processor for reproducing the bit stream of corresponding channels decoded by the syntax processor into video data according to a predetermined video reproduction format.

BRIEF DESCRIPTION OF THE DRAWINGS

The above objectives and advantages of the present invention will become more apparent by describing in detail preferred embodiments of the invention with reference to the attached drawings in which.

DETAILED DESCRIPTION OF THE INVENTION

A preferred embodiment of the present invention will be described below with reference to the accompanying drawings.

Figure 1:
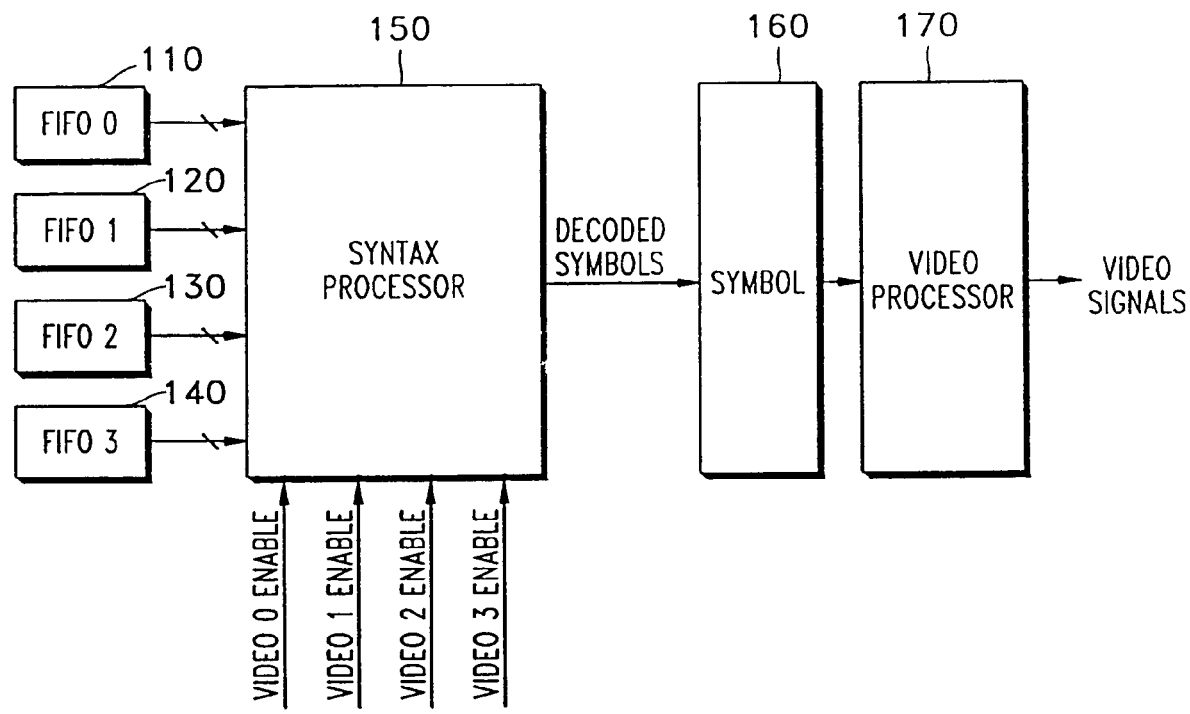
FIG. 1 is a main block diagram showing a multiplexing video decoding apparatus according to the present invention.

FIG. 1 is a main block diagram showing a multiplexing video decoding apparatus according to the present invention. The apparatus of FIG. 1 includes 1st, 2nd, 3rd, and 4th First-In First-Out (FIFO) memories 110, 120, 130, and 140, respectively, a syntax processor 150, a symbol FIFO memory 160, and a video processor 170.

In general, according to a digital television (DTV) specification, four SD-class channels can be placed in one transponder for transmission. According to FIG. 1, compression-coded video streams of a plurality of channels are transmitted (first-in and first-out) through the 1st, 2nd, 3rd, and 4th FIFO memories 110, 120, 130, and 140. Here, four FIFO memories are used in order to simultaneously decode the four channel video signals. The syntax processor 150 decodes bit streams of the plurality of channels input from the 1st, 2nd, 3rd, and 4th FIFO memories 110, 120, 130, and 140, in a multiplexed mode by cyclically selecting a bit stream according to an index value. That is, the syntax processor 150 decodes bit streams input with zero-run-length and a discrete cosine transform (DCT) coefficient pair by 1st, 2nd, 3rd, or 4th enable signals VIDEO 0 ENABLE, VIDEO 1 ENABLE, VIDEO 2 ENABLE, VIDEO 3 ENABLE, respectively, selected by an index register, generates symbolized forms, and generates flag information for indicating that a video signal of a channel is to be decoded. A symbol FIFO memory 160 buffers and outputs symbols decoded in the syntax processor 150, to a video processor 170.

The video processor 170 carries out motion compensation and an Inverse Discrete Cosine Transform (IDCT) for symbols received from the symbol FIFO memory 160, and outputs pixel values which are video signals to be displayed. At this time, since the information received from the symbol FIFO memory 160 includes a flag for indicating a corresponding channel for the video information, the video processor 170 processes the signal using a memory corresponding to each video channel portion.

Figure 2:
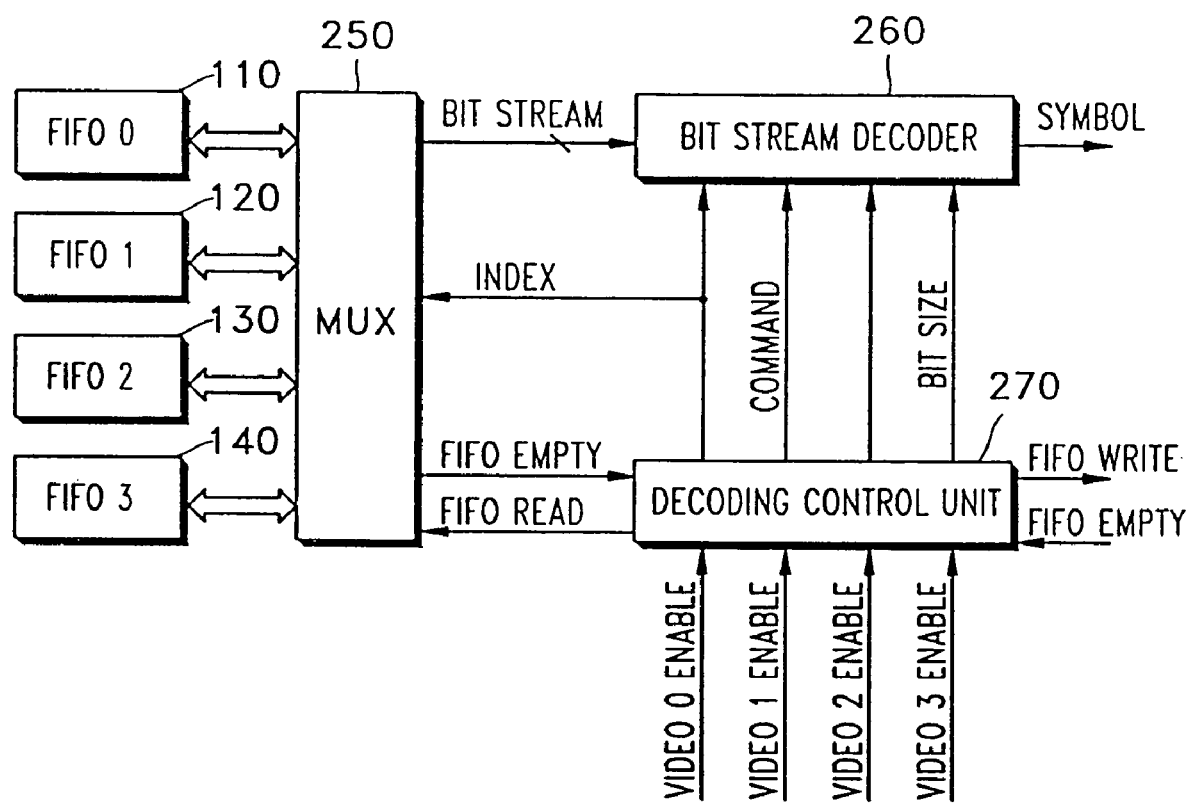
FIG. 2 illustrates a syntax processor 150 of FIG. 1 in a more detailed block diagram.

FIG. 2 illustrates the syntax processor 150 of FIG. 1 in a more detailed block diagram. According to FIG. 2, a bit stream decoder 260 decodes the bit stream which includes a fixed-length code, a variable-length code, etc., according to the compression-coding specification, and generates video parameters, zero-run-length and a DCT coefficient pair in the form of a symbol.

A decoding control unit 270 switches each decoding task by cyclically applying an index value to a multiplexer (MUX: 250) in order to simultaneously decode the four channel Standard Definition (SD)-class video signals input from the 1st, 2nd, 3rd, and 4th FIFO memories 110, 120, 130, and 140. The decoding control unit 270 exchanges a FIFO EMPTY and a FIFO READ signal through the multiplexer 250 with the 1st, the 2nd, the 3rd, and the 4th FIFO memories 110, 120, 130, and 140, and an FIFO EMPTY and an FIFO WRITE signal with the symbol FIFO memory 160. At the same time, the decoding control unit 270 controls a bit stream decoder 260 according to a Moving Picture Experts Group (MPEG) Specification. That is, the decoding control unit 270 decodes a corresponding channel by applying a command which designates the kind of variable code table and supplying bit size information which shows the number of bits of fixed code to extract to a bit stream decoder 260, and outputs the result. In addition, the decoding control unit 270 controls an interface to a host, decision of operation mode, decoding time, and display modes such as 3:2 pull-down, or skip/repeat.

Figure 3:
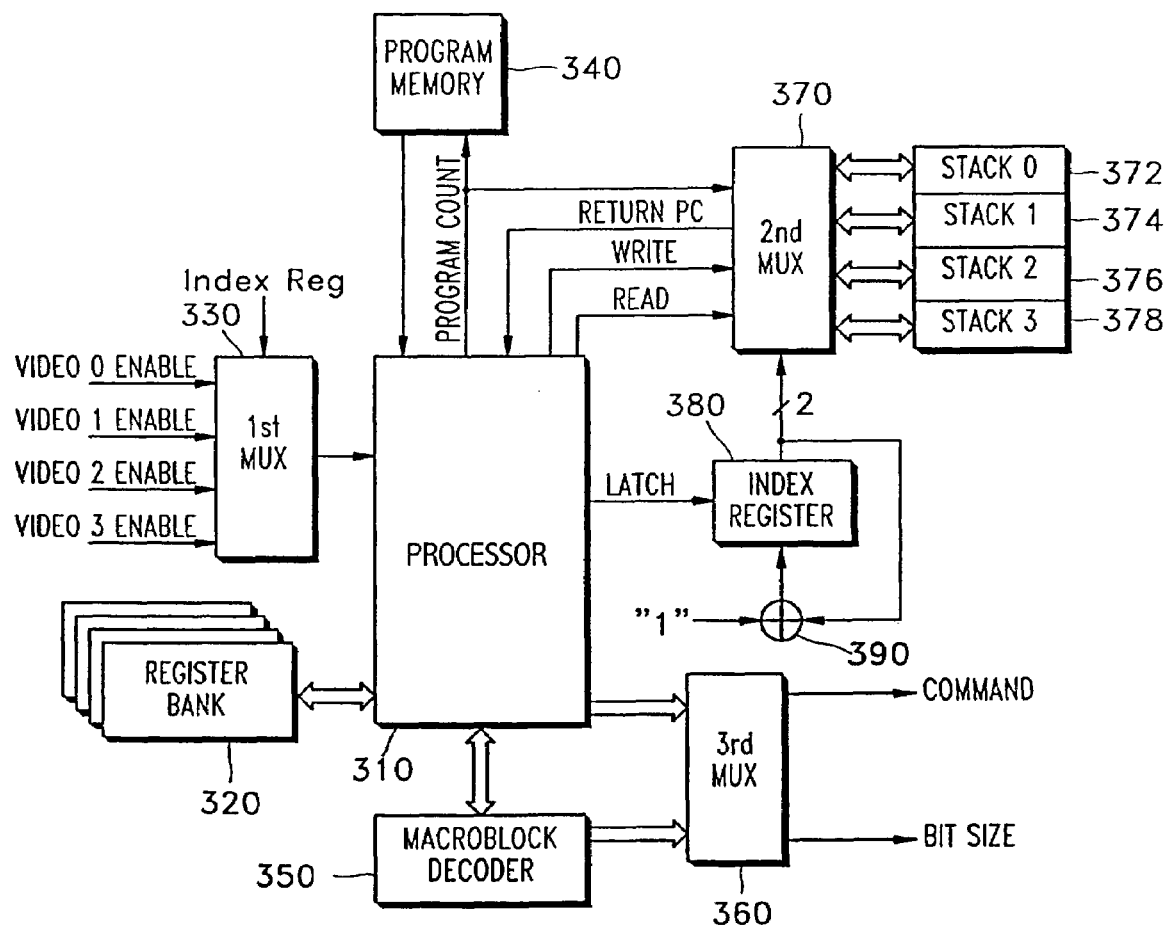
FIG. 3 illustrates a decoding control unit 270 of FIG. 2 in a more detailed block diagram.

FIG. 3 illustrates a decoding control unit 270 of FIG. 2 in a more detailed block diagram.

According to FIG. 3, a 1st multiplexer 330 selects one corresponding video enable signal among the 1st, 2nd, 3rd, and 4th video enable signals VIDEO 0 ENABLE, VIDEO 1 ENABLE, VIDEO 2 ENABLE, VIDEO 3 ENABLE by an index value generated in and output from the index register 380 in order to operate the four channel video signals in a multiplexed mode. Four register banks 320 independently store control parameters and program parameters for each video signal channel selected by the 1st multiplexer 330. A 3rd multiplexer 360 selects a command and a bit size information generated in and output from a processor 310 and a macroblock decoder 350.

The processor 310 downloads a video decoding and control program from a host into a program memory 340, decodes each channel video signal to a macroblock level or higher levels, and executes various control operations with the control program. In addition, the processor 310 generates a latch signal (LATCH) which increments the index value of the index register 380 by 1. The macroblock decoder 350 is a hardware module for decoding macroblocks.

After the processor 310 decodes a macroblock or higher levels, the processor 310 transfers control over the bit stream decoder 260 to the macroblock decoder 350, and then the macroblock decoder 350 transfers control over bit size information and commands to the bit stream decoder 260. Therefore, multiplexing video decoding is concurrently executed with four independent tasks sharing one processor 310 and one macroblock decoder 350.

For multiplexing video decoding, four stacks 372, 374, 376, and 378 are multiplexed by a 2nd multiplexer 370, and the 2nd multiplexer 370 selects each stack according to an index value generated by the index register 380. The index register 380 includes 2 bits, and increments the index value by 1 according to a latch signal generated from the processor 310, which designates cyclically each decoding task of the four channels, in the order of 0, 1, 2, 3, 0, 1, 2, . . . . A decoding task of each channel has dedicated FIFO memories 110~140 and register banks 320 to store video parameters and program status of each channel. In addition, the input FIFO memories 110~140 and the register banks 320 are also switched when a task is switched.

Contrary to usual stacks which have certain portions of a main memory, the four stacks 372, 374, 376, and 378 are hardware registers and only store values of program counters (PC).

If a task switching function is called from a decoding program of the processor 310, the corresponding task switching function is executed by enabling a write signal for a current PC value to be stored into a stack allocated to the current task. When the called task switching function is finished and returned, a read signal is enabled, the PC value stored in the stack is reloaded, and the PC value of the location which called the task switching function is returned.

Figure 4:
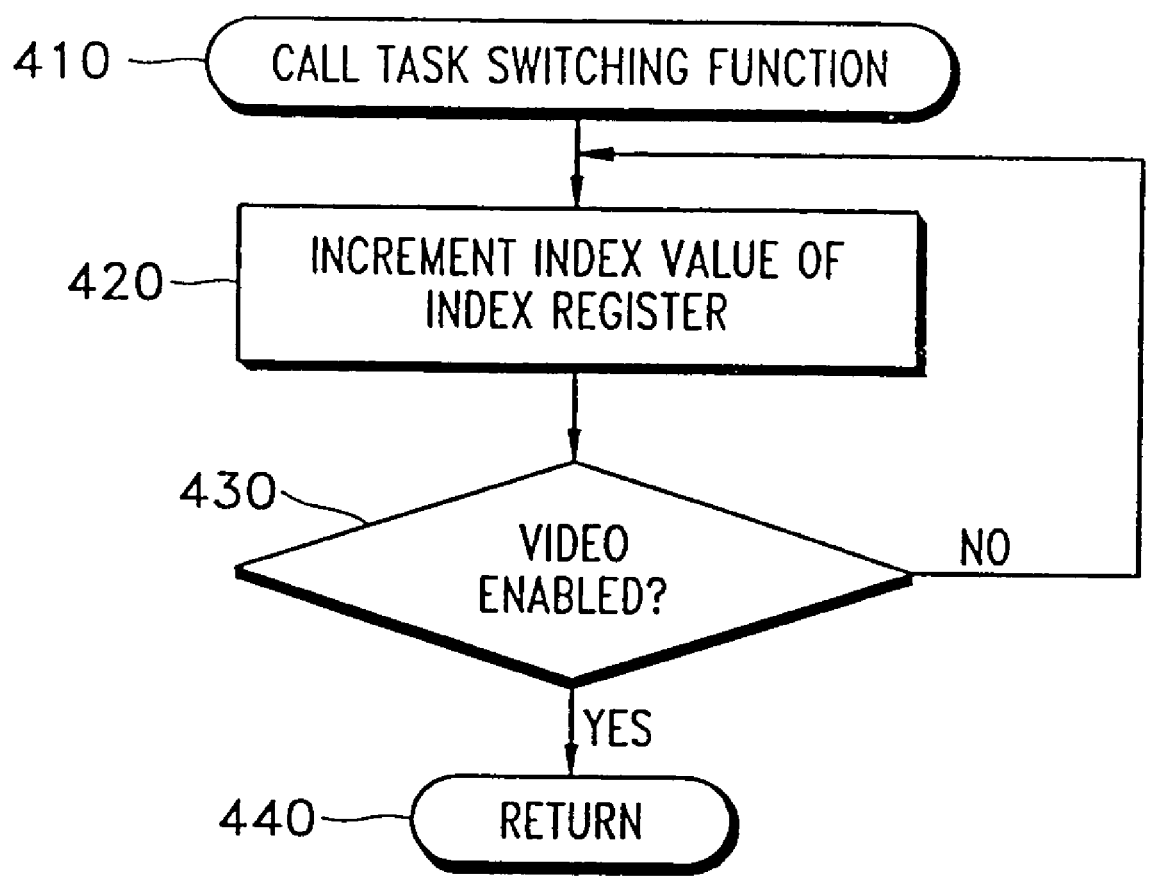
FIG. 4 is a flowchart of a task switching function to which the means of FIG. 3 is applied.

FIG. 4 is a flowchart showing a method of decoding task switching according to the present invention.

First, when decoding of a slice is finished during execution of a main program, a task switching function is called in step 410, and the PC value of the channel being decoded is stored in a stack designated by the index register 380 and allocated to the current task. The task switching function increments the index value of the index register by 1 using a latch signal in step 420. If the channel is video-enabled in step 430, the task switching function finishes task switching, and returns in step 440. At that time, since the index register 380 has been incremented by 1, the PC value stored in the next task is loaded. Therefore, the task automatically begins from the PC value in which the task stopped previously. If a channel to be decoded is not video-enabled, the task switching function increments the index value of the index register 380 by 1 and skips the decoding task of the channel.

Figure 5:
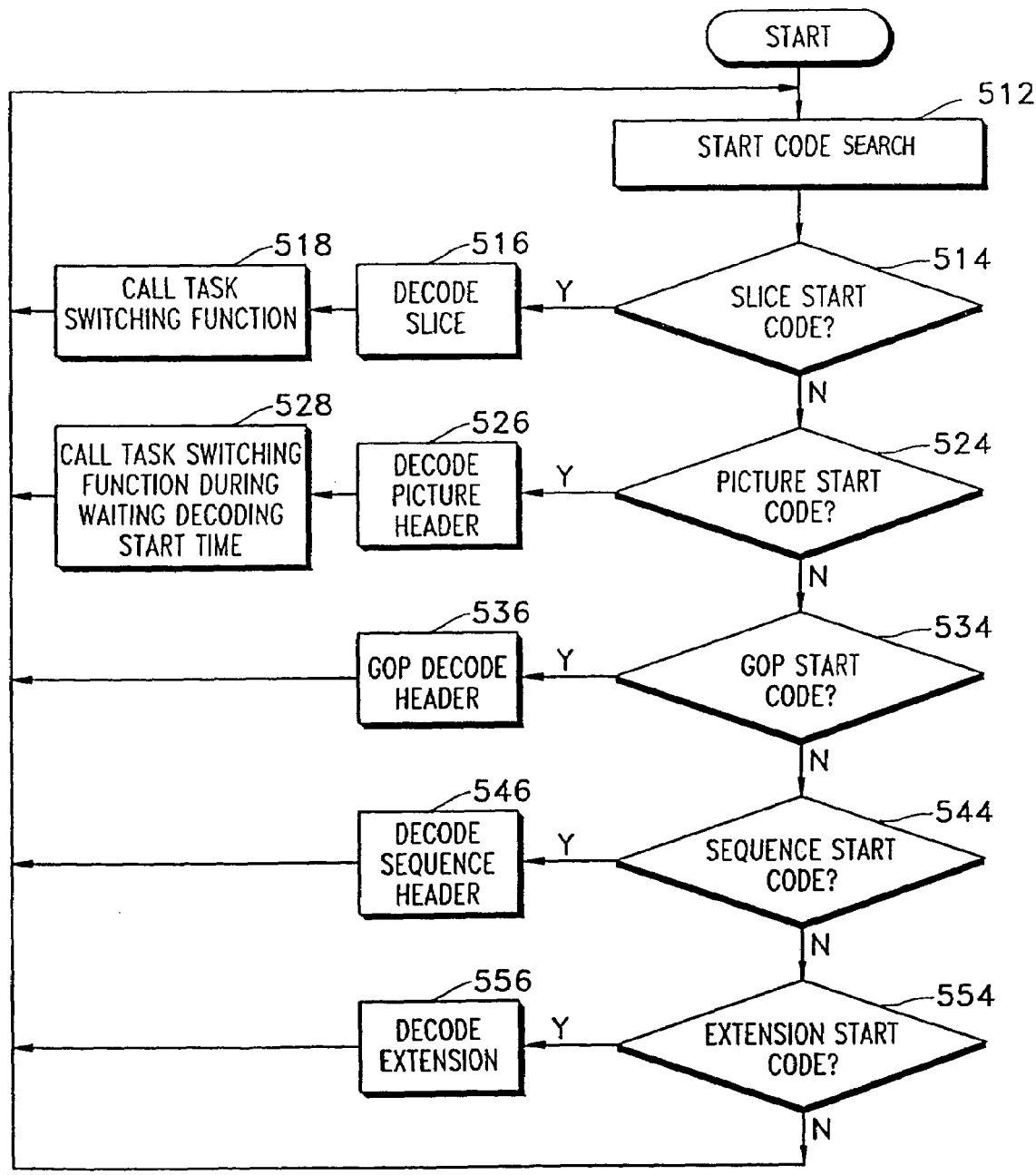
FIG. 5 is an entire flowchart showing a multiplexing video decoding method according to the present invention.

FIG. 5 is an entire flowchart showing a multiplexing video decoding method according to the present invention.

A bit stream used in an MPEG-2 specification is divided into a layer of sequences, Group of Picture (GOP), picture, slice, and macroblock in consideration of the syntax of a bit stream. Here, the picture layer includes a plurality of slice units. Therefore, a plurality of bit streams is task-switched by slice, and time-division-multiplexed in an interval of a slice.

First, a Start Code is detected in header information of a bit stream input during execution of a main program in step 512. At this time, if the Start Code is a Slice Start Code in step 514, the slice is decoded in step 516, and a decoding task switching function is called in step 518. However, if the Start Code is a Picture Start Code in step 524, a picture header is decoded in step 526, and then a task switching function is called in a loop which waits a decoding start time in step 528. If the next Start Code is a GOP Start Code in step 534, a GOP header is decoded in step 536. In addition, if the Start Code is a Sequence Start Code in step 544, a sequence header is decoded in step 546. Also, if the Start Code is an Extension Start Code in step 554, an extension is decoded in step 556.

Therefore, a decoding task switching point is located immediately after slice decoding, and, if slice decoding of a channel is finished, slice decoding of the next channel is performed by task switching. In addition, if a decoding task enters a waiting loop state, the next task is switched to by locating a task switching point inside a waiting loop for controlling decoding display time.

Figure 6:
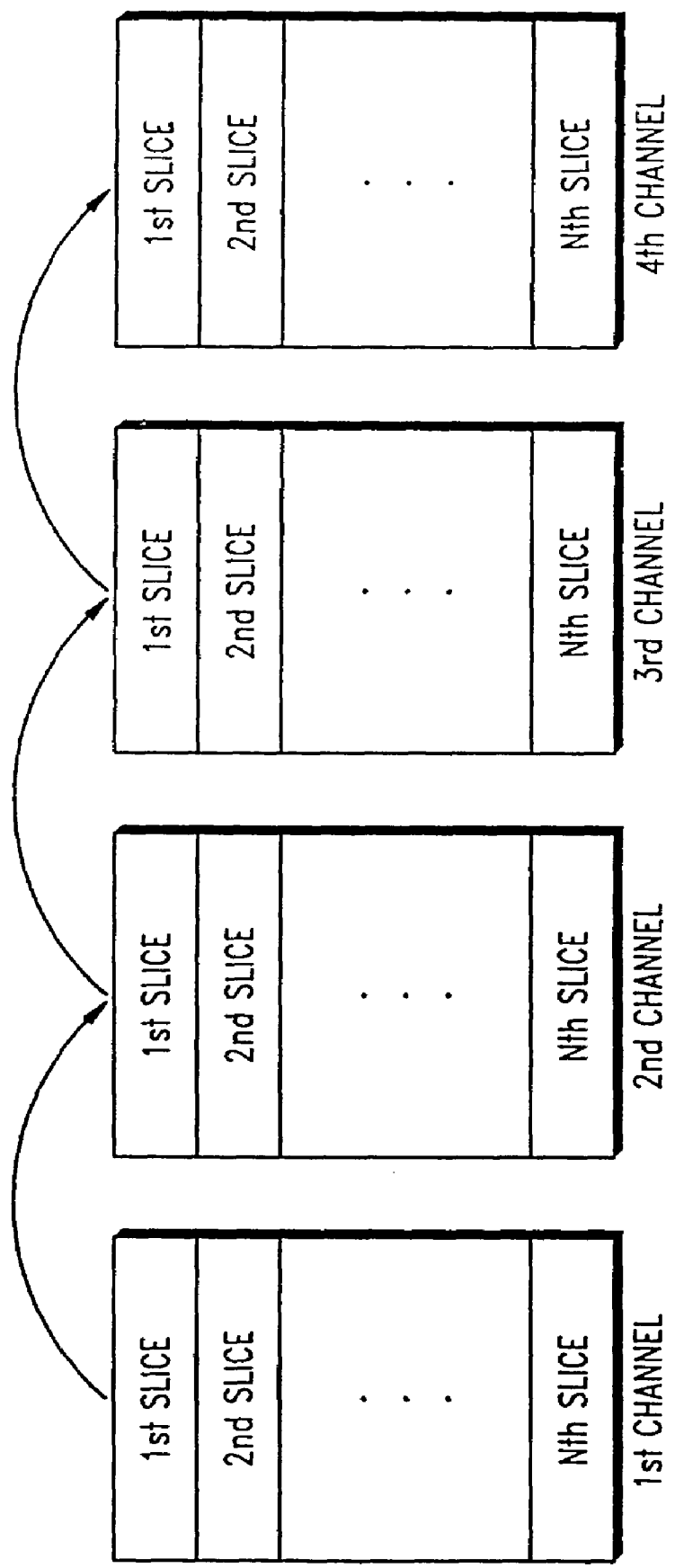
FIG. 6 is a conceptual diagram showing an implementation of the multiplexing video decoding method of FIG. 5.

FIG. 6 is a conceptual diagram showing an implementation of the multiplexing video decoding method of FIG. 5.

According to FIG. 6, bit streams, which are input in parallel to 1st, 2nd, 3rd, and 4th channels, include picture units, and the picture unit include 1st, 2nd, 3rd, . . . , and Nth slice unit.

First, the 1st slice unit of the 1st channel is decoded, and then a decoding task of the 1st slice of the next channel is switched to. Here, while checking a video-enable state of the next channel, slice units of the 2nd, 3rd, and 4th channels are decoded sequentially. If decoding of the 1st slice of each channel is completed, the 1st channel is again switched to, and decoding of the next slice unit is again performed sequentially. In this manner, each channel's input video signal is multiplexed and decoded.

According to the present invention as described above, four channel SD-class video signals in a transponder can be decoded in a time-division-multiplexing mode in a set of tuner and channel units using an HD-class video decoder, which enables minimum hardware to have an effect similar to using four video decoders. Particularly, a plurality of stacks and register banks are included for the decoding task switching, which enables the independent control of video signals of each channel with software without implementing operating system kernel-level complicated algorithms.

In addition, if video signals of different transponders are input using two sets of tuners and channel units, multiplexing decoding between arbitrary channels is enabled, and such functions as Picture In Picture (PIP) and Picture Out of Picture (POP) can be implemented.

The invention claimed is:

1. A multiplexing video decoding method for receiving bit streams, each of said bit streams comprising a plurality of slices and received in a plurality of channels, and decoding the bit stream of each of the plurality of channels in a multiplexed mode, the multiplexing video decoding method comprising the steps of:
    decoding video signals, wherein the decoding includes decoding a slice of a bit stream of one channel from the plurality of channels;
    sequentially switching to decode a slice of a bit stream for each of the other plurality of channels, by obtaining a program state corresponding to a program counter value associated with a respective one of the plurality of channels; and
    decoding in a multiplexed mode bit streams of the plurality of channels by repeating the above steps for a next slice in each of the plurality of channels.

2. The multiplexing video decoding method of claim 1, wherein the predetermined unit of a bit stream is a slice of a bit stream.

3. The multiplexing video decoding method of claim 1, wherein the decoding step further comprises:
    incrementing an index value for a register corresponding to one of the plurality of channels to obtain information for a current channel when a decoding switching function is called;
    determining whether decoding of the current channel corresponding to the index value is video-enabled; and
    executing the decoding process if the current channel is video-enabled, and otherwise, switching to a decoding process of a next channel.

4. The multiplexing video decoding method of claim 1, wherein video parameters and a program status to be decoded in each channel are designated whenever the decoding is switched from one of said plurality of channels to another of said plurality of channels.

5. The multiplexing video decoding method of claim 1, further comprising a step for switching a task inside a waiting loop related to the decoding and display time control.

6. A task switching method for switching channels to be decoded in signals of a plurality of channels in a multiplexing video decoding method, the task switching method comprising the steps of:
    incrementing an index register value for a register corresponding to one of the plurality of channels to obtain information for a current channel when a task switching function is called;
    finishing task switching if video decoding of the current channel corresponding to the index value is enabled, and otherwise, incrementing the index register value, and then switching to a next task, by obtaining a program state corresponding to a program counter value associated with a respective one of the plurality of channels.

7. A multiplexing video decoding apparatus for receiving bit streams, each of said bit streams comprising a plurality of slices and received in a plurality of channels, and for decoding the bit stream of each of the plurality of channels, the multiplexing video decoding apparatus comprising:
    a plurality of First-In First-Out (FIFO) units for transmitting in a first-in-first-out manner the bit streams of the plurality of channels in parallel;
    a syntax processor for cyclically decoding the bit streams of the plurality of channels output from the plurality of FIFO units at a slice interval, by obtaining a program state corresponding to a program counter value associated with a respective one of the plurality of channels; and
    a video processor for reproducing the bit stream of a corresponding channel decoded by the syntax processor into video data according to a predetermined video reproduction format.

8. A multiplexing video decoding apparatus for receiving bit streams, each of said bit streams comprising a plurality of slices and received in a plurality of channels, and for decoding the bit stream of each of the plurality of channels, the multiplexing video decoding apparatus comprising:
    a plurality of First-In-First-Out (FIFO) units for transmitting in a first-in-first-out manner the bit streams of the plurality of channels in parallel;
    a syntax processor for cyclically decoding the bit streams of the plurality of channels output from the plurality of FIFO units at a slice interval; and
    a video processor for reproducing the bit stream of a corresponding channel decoded by the syntax processor into video data according to a predetermined video reproduction format, wherein the syntax processor further comprises:
    a plurality of stacks, each of said plurality of stacks respectively storing a program counter value of a channel to be decoded;
    an index register for generating an index value for selecting a channel to be decoded from the plurality of stacks; and
    a processor for selecting a channel to be decoded by slice by cyclically incrementing the index value of the index register and to obtain a program state corresponding the program counter value that has been pushed into the respective one of the plurality of stacks for the channel.

9. The multiplexing video decoding apparatus of claim 8, wherein the syntax processor switches a decoding task immediately after decoding a slice unit.

10. The multiplexing video decoding apparatus of claim 9, further comprising a plurality of registers which independently store control parameters and program parameters of each channel bit stream and are designated in a multiplexed index register value mode.

11. The multiplexing video decoding apparatus according to claim 8, wherein the syntax processor further includes a macroblock decoder to extract bit stream size and command information for a channel.

12. The multiplexing video decoding apparatus according to claim 11, wherein the syntax processor further includes a bit stream decoder receiving said bit stream size and command information from said macroblock decoder to provide a reproduced bit stream for use by said video processor.

13. The multiplexing video decoding apparatus of claim 8, wherein said index register further generates an index value for selecting one of said plurality of FIFCO units to obtain video bit steam information.

\* \* \* \* \*